(12) United States Patent
Preston et al.

(10) Patent No.: US 8,666,313 B2
(45) Date of Patent: Mar. 4, 2014

(54) PAIRING DEVICES USING DATA EXCHANGED IN AN OUT-OF-BAND CHANNEL

(75) Inventors: John B. Preston, Plantation, FL (US); Robert J. Higgins, Plantation, FL (US); Anu W. Khera, Lakewood, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 231 days.

(21) Appl. No.: 13/194,204

(22) Filed: Jul. 29, 2011

(65) Prior Publication Data

US 2013/0029596 A1    Jan. 31, 2013

(51) Int. Cl.
   *H04B 5/00* (2006.01)
(52) U.S. Cl.
   USPC .......... 455/41.1; 455/41.2; 455/103; 370/310
(58) Field of Classification Search
   USPC .................. 455/41.1, 41.2, 103, 450, 552.1; 370/310
   See application file for complete search history.

(56) References Cited

U.S. PATENT DOCUMENTS

| | | | |
|---|---|---|---|
| 7,987,378 B2 | 7/2011 | Lee et al. | |
| 8,396,424 B2 | 3/2013 | Frazier et al. | |
| 8,412,097 B2 | 4/2013 | Tao et al. | |
| 8,417,186 B2 | 4/2013 | Preston et al. | |
| 8,503,929 B2 | 8/2013 | Ibrahim et al. | |
| 2011/0028091 A1 | 2/2011 | Higgins et al. | |

*Primary Examiner* — Tuan H Nguyen
(74) *Attorney, Agent, or Firm* — Barbara R. Doutre

(57) ABSTRACT

Two devices (110, 120) can be determined to be within near field communication (NFC) range of each other. Pairing information for a service can be conveyed over an out-of-band channel (114, 124). The out-of-band channel can be a near field communication (NFC) channel. The service can be a Bluetooth service provided via an in-band (e.g., BLUETOOTH) channel (112, 122). The conveying of the pairing information can require the first device (110) to request at least one desired service, to provide a device ID, and to provide an authorization code in a single message (150). In response to the single message (150), the second device (120) can either deny the request (160, 162) or can convey resource use parameters for the desired service and an ID for the second device within a second single message (164). Pairing the two devices (110, 120) can require use of the authorization code and the resource use parameters.

20 Claims, 8 Drawing Sheets

Beacon Broadcast Message 410

| Offset 412 | Field 413 | Size (bits) 414 | Value 415 | Description 416 |
|---|---|---|---|---|
| 0 | LF Security Capability | 8 | Bit field | The bits are reserved for different types of LF encryptions. |

Confirmation Message 420

| Offset 422 | Field 423 | Size (bits) 424 | Value 425 | Description 426 |
|---|---|---|---|---|
| 0 | LF Security Capability | 8 | Bit field | This field is to tell the device "Use this Security formats." If all 8 bits in the data of the beacon are 0, then implies "No LF Encryption." |

FIG. 4A

In-Band Service Request Message 430

| Offset 432 | Field 433 | Size (bits) 434 | Value 435 | Description 436 |
|---|---|---|---|---|
| 0 | Payload Length (Size) 442 | 4 | Number | Size of this Data Packet. |
| 4 | Transaction Type 443 | 4 | Enumeration | Provides enumeration for different transaction types |
| 8 | Transaction Type Request Data Payload 444 | variable | Structure | 'BLUETOOTH_STANDARD.' To Be Defined for other communication technologies. |
| n+ | CRC 445 | 16 | Number | This is a calculated checksum that is dependant on the message content |

In-Band Service Response Message 450

| Offset 452 | Field 453 | Size (bits) 454 | Value 455 | Description 456 |
|---|---|---|---|---|
| 0 | Payload Length (Size) 462 | 3 | Number | Size of this Data Packet. Refer to section for details. Data Packet Size of 1 byte implies a failure/NACK. |
| 5 | Reject Result Code (Optional Field) 463 | 5 | Enumeration | This is an optional field. This field will only be visible in a message for an unsuccessful reply. |
| 16 | Transaction Type Reply Data Payload 464 | n | Structure | Definition is communication technology dependent. |
| n+ | CRC 465 | 16 | Number | This is a calculated checksum that is dependant on the message content |

FIG. 4B

PAIRING DEVICES USING DATA EXCHANGED IN AN OUT-OF-BAND CHANNEL

FIELD OF THE INVENTION

The invention generally relates to wireless device pairing using a non-propagating radio signal.

BACKGROUND

BLUETOOTH™ is a proprietary open wireless technology standard for exchanging data over short distances to create personal area networks (PANs) with high levels of security. BLUETOOTH is a layered protocol architecture consisting of multiple different protocols. One of the protocols is a Service Discovery Protocol (SDP) that allows a device to discover services (BLUETOOTH profiles) that are supported by other devices.

Bluetooth profiles (services) define possible applications and specify general behaviors that Bluetooth enabled devices use to communicate with other Bluetooth devices. These profiles include settings to parameterize and to control the communication.

Bluetooth uses a process called pairing, where two devices need to be paired to communication with each other. Pairing mechanisms include legacy pairing and Secure Simple Pairing (SSP), where SSP is supported in Bluetooth v2.1 and greater. SSP includes a number of modes of operation of "just works", "numeric comparison", passkey entry", and "out of band (OOB)".

With respect to an OOB methodology for devices utilizing the Bluetooth protocol, it has been proposed that pairing between host and peripheral devices can be facilitated using "Near Field Communication (NFC)" OOB technology. However, a known implementation of NFC in device pairing requires an initial discovery and authentication procedure utilizing propagating electromagnetic radio waves (e.g., signals exchanged between BLUETOOTH transceivers). Known NFC pairing also requires a keypad on the host device for a user to initiate the pairing procedure, such as through the use of a menu. An example of a proposed NFC pairing is the "Near Field Communication (NFC) interface and Protocol" (NFCIP-1) by EMCA.

BRIEF SUMMARY

One embodiment for paring two devices (a first and a second device) begins while in-band (BLUETOOTH) transceivers of two devices to be paired are in an off state and out-of-band (OOB) transceivers of the two devices are in an on state. The OOB transceivers can be near field communication (NFC) transceivers in one embodiment. Two devices can be determined to be within OOB communication range (which may be within NFC range in one embodiment) of each other. Pairing information for an in-bound channel (requiring use of the in-band transceivers) can be conveyed over an out-of-band channel (requiring use of the out-of-band transceivers). The conveying of the pairing information can require the first devices to request at least one desired in-band service, to provide a device ID as well as an authorization code in a single message. In response to the single message, the second device either denies in-band service or conveys resource use parameters for the in-band service and provides its device ID. The resource use parameters and device ID are conveyed within a second single message. Responsive to the conveying of pairing information, the two devices can turn on the in-band transceivers. The pairing can be a secure pairing that requires use of the authorization code and the resource use parameters.

In one embodiment, the first single message can be conveyed to the second device without the second device announcing a full list of supported services to the first device.

In one embodiment, the in-bound transceivers and the in-bound channel can be compliant with Bluetooth version 2.1 protocol standards, and the pairing can occur without violating Bluetooth version 2.1 secure simple pairing (SSP) Out of band (OOB) pairing standards.

In one embodiment, the desired service can be a non-standard service that is not defined by the Service Discovery Protocol (SDP) of the two devices. The non-standard service can be conducted over a generic service of the in-band connection that is defined by the Service Discovery Protocol (SDP) of the two devices. The generic service can be a Serial Port Protocol (SPP) service or a Logical Link Control and Adaptation Protocol (L2CAP) service.

In an embodiment of the disclosure, a device (e.g., a host device) having an in-band transceiver and at least one out-of-band transceiver can receive an out-of-band message. The out-of-band message can be from a different device (e.g., an accessory). The out-of-band message can indicate at least one desired in-band service, an authorization code, and a device ID for the different device. A determination of whether the device is available to satisfy the desired in-band service can be made, which results in a positive or a negative determination. When the determination is negative, the out-of-bound message can be ignored or a denial message can be sent to the different device via the out-of-band channel. When the determination is positive, resource use parameters for the desired in-band service can be conveyed to the different device via the out-of-band channel. The device can use the authorization code provided by the different device to establish the in-band service. The different device (accessory) can use the resource use parameters conveyed in the out-of-bound channel to establish the in-band service.

In an embodiment of the disclosure, a device (e.g., an accessory) having a Bluetooth transceiver and at least one Near Field Communication (NFC) transceiver can send an out-of-band message via the NFC transceiver. The out-of-band message can indicate at least one desired Bluetooth service, can provide a device ID of the device, and can provide an authorization code for the device. The Bluetooth transceiver can initially be in an off state. A response can be received from a different device (e.g., a host device) via the NFC transceiver, which provides an ID for the different device and resource use parameters for the Bluetooth service. The Bluetooth transceiver can be changed to an on state. The Bluetooth service can be established with the different device using the resource use parameters. The sending, receiving, turning on, and establishing of the Bluetooth service can occur without requiring any user interactions with the device other than bringing the device within NFC range of the different device. The different device may not send the device a complete list of Bluetooth services supported by the device but may only provide the response that indicates resource use parameters for the desired Bluetooth service in an event that the different device is able to provide the desired Bluetooth service to the device. Bluetooth can refer to a protocol compliant with Bluetooth version 2.1 protocol standards.

BRIEF DESCRIPTION OF THE DRAWINGS

FIGS. 4A and 4B shows a set of messages exchanged out-of-band when pairing two devices in accordance with an embodiment of the inventive arrangements disclosed herein.

DETAILED DESCRIPTION OF THE INVENTION

Figure 1:
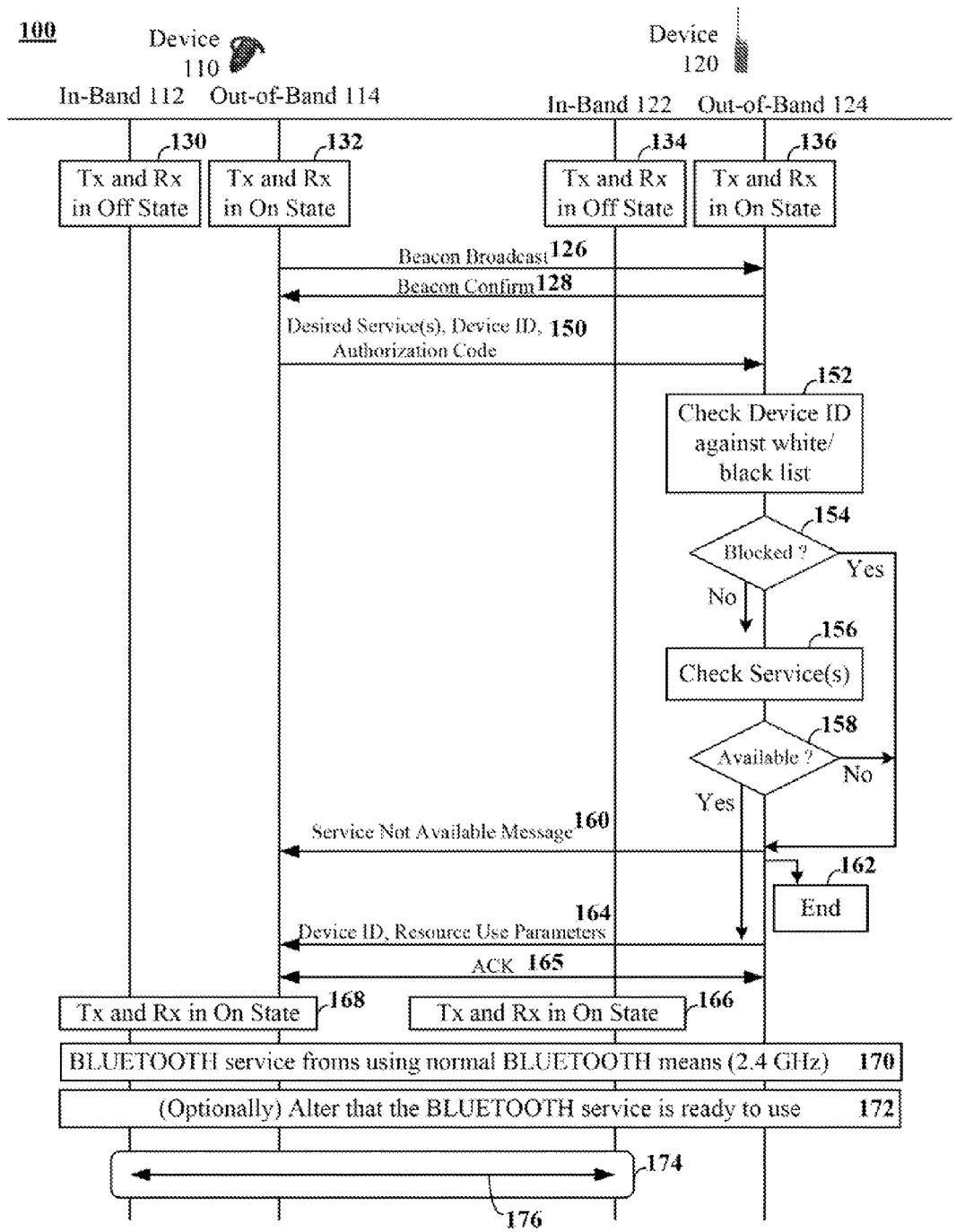
FIG. 1 is a diagram for out-of-band pairing of two devices in accordance with an embodiment of the inventive arrangements disclosed herein.

An embodiment of the disclosure permits pairing of Bluetooth devices using data conveyed over an out-of-band (OOB) channel. In one embodiment of the disclosure, the device pairing detailed herein is compliant with the Bluetooth v2.1 secure simple pairing (SSP) pairing mechanism.

Conventional methodologies treat Bluetooth services (e.g., BLUETOOTH profiles) as polled services, where devices broadcast a list of services that are provided by that device, which other devices can receive and process. In an embodiment of the disclosure, a Bluetooth device initiating a connection can specify, via an OOB message, what services they desire from a proximate device, (e.g., a host device) along with device address information identifying the requesting device and an authorization code for establishing the service. The host device can receive this request and can determine whether the requested service is available from the host device. If not, the host device can convey a negative response and/or ignore the request. In either case, the requesting device is not provided any information from the host device. If the requested service is available, resource usage parameters for that service can be provided to the requesting device over the OOB channel. The requesting device and host device can establish a Bluetooth communication for the Bluetooth service using the resource usage parameters and the authorization code to create a secure link.

In one embodiment, the host device can check the receiving device address information against a white or black list before responding to the request. A white list can represent an approved list of devices that are permitted to pair with the host device (where pairing attempts by devices not in the white list can be automatically denied, in one embodiment). A black list can represent a list of devices that are explicitly not permitted to pair with the host device (where pairing attempts by devices not in the black list can be accepted, in one embodiment). In one embodiment, white and black lists can be used for specific types of pairing (as opposed to all paring attempts) and can be used to establish/deny specific levels of privilege when pairing devices. In embodiments implementing a white/black list, if the receiving device is not authorized to connect to the host, even if the requested service is available, no positive response (which includes connecting details for the service) is provided to the receiving device.

In one embodiment, a set of one or more non-standard profiles can be defined (e.g., a proprietary profile) for the host device and/or the receiving device. That is, the Service Discovery Protocol (SDP) of the Bluetooth stack of at least one of the devices can lack support for the non-standard profile. Nonetheless, the receiving device can request the non-standard profile (or service) over the OOB channel. The host device can indicate availability of the non-standard profile (or service) over the OOB channel, as noted above. Thus, even though a SDP of the Bluetooth stack doesn't support the non-standard profile, the two devices can request and indicate availability of this service, using Bluetooth v2.1 compliant Secure Simple Pairing (SSP) mechanisms. It should be noted that actual communications for the non-standard protocol can be established over a generic connection type that is supported by the SDP, such as a Serial Port Protocol (SPP) service or Logical Link Control and Adaptation Protocol (L2CAP) service.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-transitory medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a diagram 100 for out-of-band pairing (e.g., BLUETOOTH v2.1 pairing) of two devices in accordance with an embodiment of the inventive arrangements disclosed herein. Embodiments of the disclosure have significantly faster pairing times (e.g., less than one second) compared to conventional techniques (e.g., three to five second standard BLUETOOTH pairing times). The speed improvements of the disclosed pairing technique result from fewer messages being passed between devices during a pairing process and use of a non-polling technique (where an entire list of services provided by a BLUETOOTH device is not conveyed to another, as is standard practice). Further, security for pairing is improved by not passing information of a host device (one that another device is attempting to connect to) unless services are available. Additionally, one embodiment provides an ability to pass additional resource information and/or to permit non-standard services to be conveyed between two devices, even when no specific Bluetooth profile exists for the non-standard service.

In diagram 100, two devices 110, 120 are paired, so that they are able to communicate using Bluetooth v2.1 compliant mechanisms, which are referred to as an in-band communication connection. The devices 110, 120 can be any electronic devices equipped with a Bluetooth transceiver, such as an accessory (e.g., headset), a host device (e.g., a two-way radio), a smartphone, a personal computer, a navigation system, and the like. Each device 110, 120 can also be equipped with at least one non-Bluetooth transceiver, over which out-of-band 114, 124 communications occur. In one embodiment, the non-Bluetooth transceiver can be a Near Field Communication (NFC) transceiver.

Diagram 100 can begin in a state where in-band transceivers of devices 110 and 120 are in an off state, as shown by 130 and 136. Out-of-band transceivers can initially be in an on state, as shown by 132 and 134. In one embodiment, the in-band transceivers can require more power than out-of-band transceivers (e.g., power requirements for BLUETOOTH can be substantially greater than those required for NFC communications), which results in overall power savings for the devices 110, 120 (compared to methodologies that require power be maintained on the BLUETOOTH transceivers).

The pairing process can begin when the devices 110 and 120 are touched or placed in close proximity to each other (i.e., within NFC range). For example, a beacon broadcast 126 can be conveyed from device 110 to device 120. The device 120 can respond with a beacon confirmation 128 message.

In step 150, device 110 can indicate via an out-of-band channel that one or more services are desired by device 110. Each of these services can utilize a Bluetooth profile. The device 110 can convey a device identifier 150 for device 110. The device 110 can also convey an authorization code within the message 150.

In step 152 (which is an optional step for when device 120 includes a white/black list), the conveyed device ID of the message 150 can be analyzed. For example, it can be compared IDs contained in a white/black list of device 120 to determine whether communications are blocked or not, as shown by step 154.

As used herein, a white list can represent an approved list of devices that are permitted to pair with the host device (where pairing attempts by devices not in the white list can be automatically denied, in one embodiment). A black list can represent a list of devices that are explicitly not permitted to pair with the host device (where pairing attempts by devices not in the black list can be accepted, in one embodiment). Entries in the white/black lists can be expressed in numerous ways, such as using a device ID, a MAC address, a unique phone number, or other unique identifier. In one embodiment, different types, categories, models, and other discoverable parameters (which can include user configurable parameters) can be listed in a white/black list. For example, in one embodiment, a police/fire department can customize parameters of host devices to ensure that only approved accessories (by the police/fire department) can connect to the host devices via a Bluetooth (or in-band) connection.

In one embodiment, white and black lists can be used for specific types of pairing (as opposed to all paring attempts) and/or can be used to establish/deny specific levels of privilege when pairing devices. The different types of pairing can refer (in one embodiment) to different Bluetooth profiles. Further, in one embodiment, non-standard profile/service (as described herein that are conveyed over an OOB channel) can be associated with a specific white/black list, which may require a device pairing with the host device to acknowledge support for the non-standard protocol before being permitted to pair with the host device for that non-standard service.

When the device 110 is permitted (i.e., is in the white list or is not in a black list) to connect to device 120, device 120 can check for available services, as shown by step 156. If not permitted, a service not available message 160 can optionally be conveyed to device 110 over the out-of-band channel. This same type of message can be sent if services are blocked per step 154. In one embodiment, the process can simply end 162, without sending a response to device 110 (if the service is not available in step 158 or if device 110 is blocked from step 154). Thus, after (or without) sending message 160, the pairing attempt can end 162.

It is notable, that in the case when device 120 is not to provide the desired service to device 110, no service information about device 120 is sent to device 110 at all. Thus, device 110 is not provided with information unique to device 120. Further, no identifying information (such as a generated pseudo-random number) is conveyed from device 120 to device 110. Further, device 120 remains communicatively "quiet," which conserves resources of device 120, while improving security.

Additionally, in embodiments where the out-of-band channel is a NFC channel, a distance between devices 110, 120 will be extremely small. Since, two devices 110, 120 must be within out-of-band 114, 124 range to pair, a number of received pairing requests will be relatively few in comparison. That is, the shorter the range for pairing, the fewer unintentional attempts to pair. This saves power, processing resources, etc., over conventional techniques (i.e., at a typical accent scene, many individuals carrying pair-able devices 110, 120 having BLUETOOTH transceivers are expected to pass in-and-out of BLUETOOTH range of each other, yet they will not often pass in-and-out of OOB range of each other).

Assuming that the requested in-band 112, 122 service(s) is available, the desired service usage parameters (e.g., resource use parameters) are sent from device 120 to device 110 via the out-of-band 114, 124 channel, as shown by message 164. This message 164 can include a device ID for device 120 and resource usage parameters for the in-band service. Acknowledgement messages 165 can then be conveyed between the devices 110, 120.

At this point, both the devices 110 and 120 can possess the necessary information (conveyed via out-of-band channel) to establish a secure in-band connection. For example, each device can establish a pairing record for the service. Both devices 110 and 120 can turn on their in-band transceivers, as shown by steps 166 and 168. The in-band service (e.g., BLUETOOTH service) can be established using normal Bluetooth means, as shown by step 170. In one embodiment, this connection requires no user interactions with the devices 110, 120 other than bringing the devices in proximity with each other. In optional step 172, one or more of the devices can show an indicator to permit a user to know that the in-band 112, 122 service has been established and is ready to use.

The in-band service can establish a stable session 174, where messages/data 176 can be bi-directionally conveyed.

References to Bluetooth in diagram 100 can refer to Bluetooth version 2.1 protocol standards. The pairing shown can occur without violating Bluetooth version 2.1 secure simple pairing (SSP) out of band (OOB) pairing standards. That is, in-band transceivers used by devices 110, 120 can use a frequency hopping spread spectrum that uses a radio frequency band of 2.4 GHz that is separated into seventy-nine bands of 1 MHz each. In one embodiment, the out-of-band channels can use a radio frequency band of 13.56 MHz (e.g., Industrial Scientific Medical band). The techniques described herein, however are not to be construed as limited to Bluetooth and/or NFC transmissions, and can be applied to other communication protocols.

Figure 2:
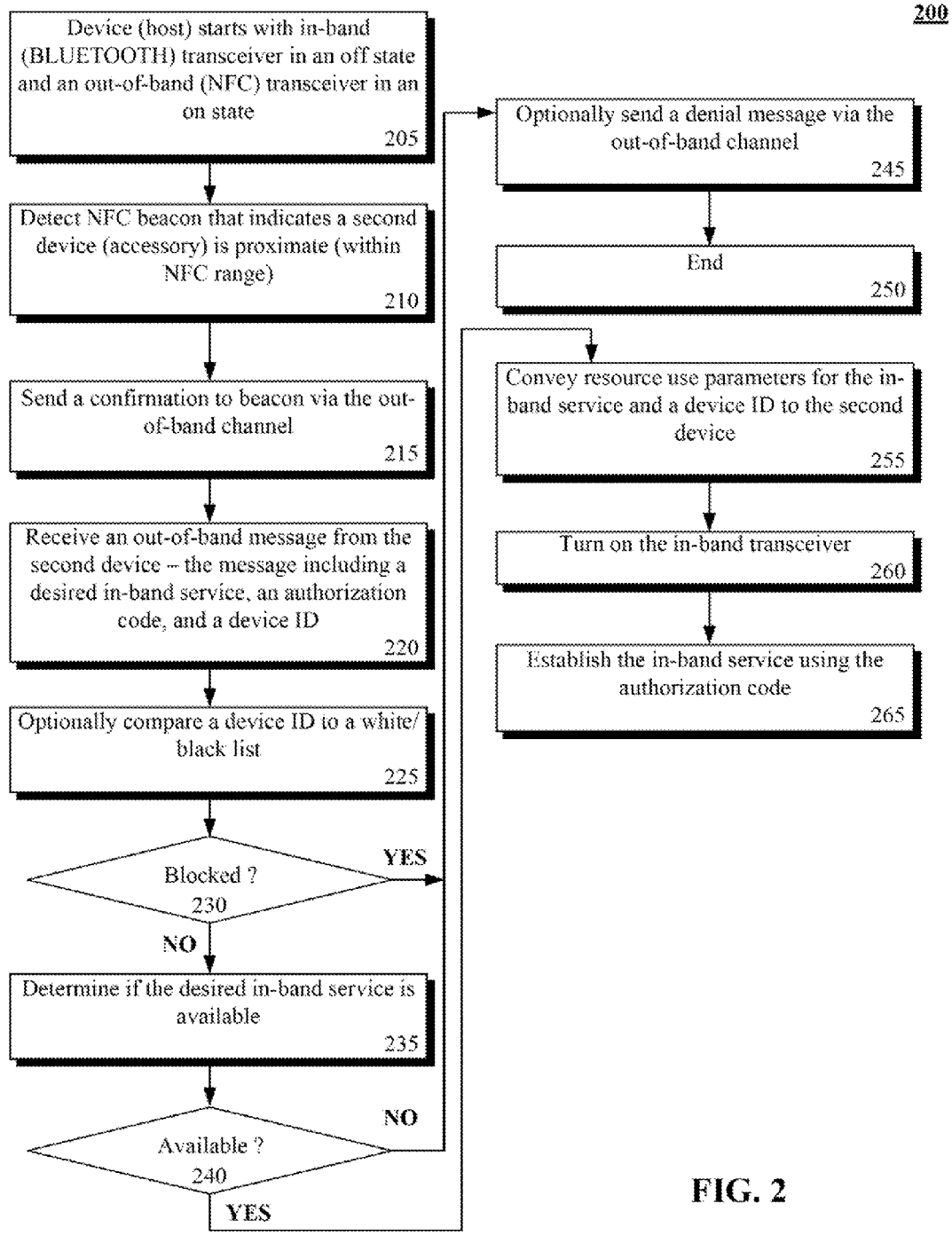
FIG. 2 shows a process for out-of-band pairing of two devices in accordance with an embodiment of the inventive arrangements disclosed herein.

FIG. 2 shows a process 200 for out-of-band pairing of two devices in accordance with the inventive arrangements disclosed herein. Process 200 is shown from a perspective of a host device (e.g., the device 120 of diagram 100).

The process 200 can begin in step 205, where a (host) device starts with an in-band (e.g., BLUETOOTH) transceiver in an off state and an out-of band (NFC) transceiver in an on state. In step 210, the device can detect a NFC beacon that indicates a second device (accessory) is proximate, meaning that it is within NFC range. In step 215, a confirmation beacon can be sent to the second device via the out-of-band channel.

In step 220, an out-of-band message can be received from the second device. This out-of-band message can include a desired in-band (e.g., BLUETOOTH) service, an authorization code, and a device ID. In step 225, the receiving device can optionally compare the device to a white/black list. If the requesting device is blocked, the process can proceed to step 245, else to step 235.

In step 235, the receiving device can determine if the desired in-band service is available. If not, the process can proceed from step 240 to step 245, else to step 255.

In step 245, a denial message can be optionally sent to the requesting device via the out-of-band channel. In step 250, the process can end.

In step 255, resource usage parameters for the desired in-band service can be sent to the requesting device along with a device ID. In step 260, the device (host) can turn on its in-band transceiver. In step 265, the in-band service can be established, where the device (host) can use the authorization code to security pair itself with the requesting device.

Figure 3:
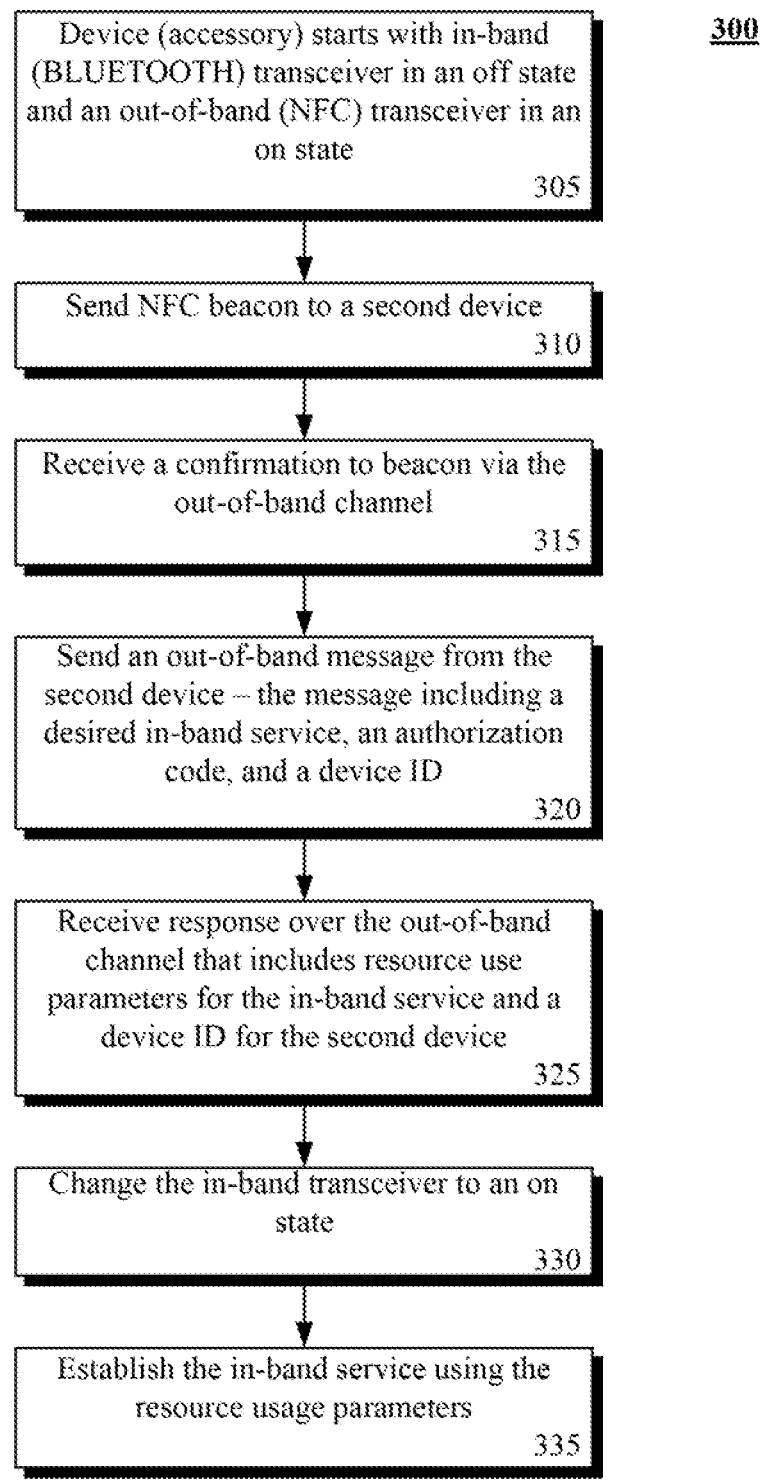
FIG. 3 shows a process for out-of-band pairing of two devices in accordance with an embodiment of the inventive arrangements disclosed herein.

FIG. 3 shows a process 300 for out-of-band pairing of two devices in accordance with the inventive arrangements disclosed herein. Process 300 is shown from a perspective of an accessory device (e.g., the device 110 of diagram 100.

The process 300 can begin in step 305, where a device (accessory) starts with an in-band (e.g., BLUETOOTH) transceiver in an off state and an out-of band (NFC) transceiver in an on state. In step 310, the device can send an NFC beacon to a second device (host). In step 315, a confirmation beacon can be received from the second device via the out-of-band channel.

In step 320, an out-of-band message can be sent to the second device. This out-of-band message can include a desired in-band (e.g., BLUETOOTH) service, an authorization code, and a device ID.

In step 325, an out-of-band response can be received, which includes resource usage parameters for the desired in-band service and a device ID for the host device. In step 330, the device (accessory) can turn on its in-band transceiver. In step 335, the in-band service can be established; where the device (accessory) can use the resource usage parameters to security pair itself with the second device.

FIGS. 4A and 4B shows a set of messages exchanged out-of-band when pairing two devices in accordance with an embodiment of the inventive arrangements disclosed herein.

For example, a beacon broadcast message 410 shows one contemplated embodiment for the broadcast beacon (e.g., beacon broadcast 126 of diagram 100) from a device to a host. Specifically, the message 410 shows an offset 412 of zero, a field 413 for low frequency (LF; referring to a NFC frequency) security capability, a size 414 of eight bits, a bit field value 415, and a description 416.

A beacon confirmation message 420 shows one contemplated embodiment for a beacon response (beacon confirm message 128 of diagram 100) from a host to a device. The message 420 can include an offset 422 of zero, an LF security capability field 423, a size 424 of eight bits, a bit field value 425, and a description 426.

With regards to message 410 and 420 it should be appreciated that the beaconing of the device is an attempt to initiate pairing with the host. The device when broadcasting the beacons is conveying its LF band security capabilities (i.e. what it is capable of doing, to the host). The host at this point will make a decision to proceed with the pairing or not, by informing the device with the mode of encryption selected. That is, the beacon message 410 can be used by the device to announce its highest security capabilities and it will be presumed to support all lesser security formats. The host can respond (in message 420) with what the link will use based on its security policy, its capability, and the capability of the accessory.

In one embodiment, the host will not reply if the security capabilities are not acceptable. The accepted behavior on the device is to timeout waiting on the reply from host and reset its state machine to beaconing mode. The beaconing messages 410, 420 are provided to illustrate one contemplated mechanism to initiate pairing and others are contemplated herein (i.e., the scope of the disclosure is not to be construed as limited to specifics of message 410 and 420).

Turning to FIG. 4B, a set of messages 430 and 450 are shown to initiate the exchange of information required to pair between the device and host. In one embodiment, the device can include its link capabilities and other relevant information (i.e. transaction type supported, transaction link encryption capabilities, address, and services required as part of the request message). The host can respond with resource usage parameters if the link capabilities have been accepted, else it will reply with a failure.

In-band service request message 430 shows one contemplated embodiment for the message 150 of diagram 100 sent from a device to a host. A precondition for message 430 can be that the beacon exchange was successful. The message 430 can include numerous different records, each having a different field name/type. The shown field name/types include: payload length 440, transaction type 443, payload 444, and a cyclic redundancy check 445. Each of these records can have an associated offset 432, field name 433, size in bits 434, value 435, and description 436 as shown.

In-band service response message 450 shows one contemplated embodiment for the message 160/164 of diagram 100 sent from a host to a device. The message 450 can include numerous different records, each having a different field name/type. The shown field name/types include: payload length 462, a reject result code 463, a transaction type reply payload 464, and a cyclic redundancy check 465. Each of these records can have an associated offset 452, field name 453, size in bits 454, value 455, and description 456 as shown.

For a failure, the reject result code 463 can state a reason code of why the communication will not be taken further between the device and host. The messages 430, 450 are provided to illustrate one contemplated format for messages and others are contemplated (i.e., the scope of the disclosure is not to be construed as limited to specifics of message 430 and 450).

Figure 5:
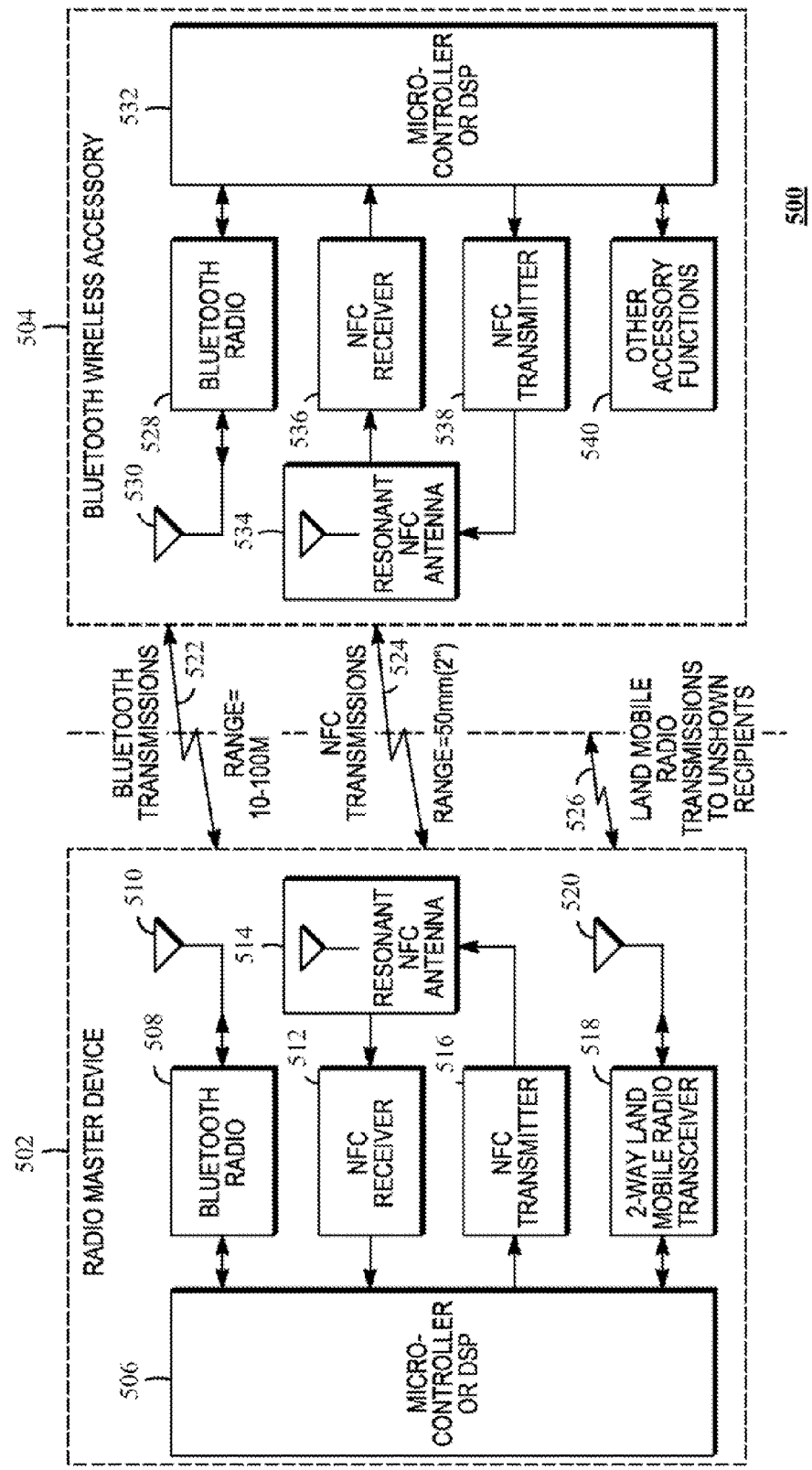
FIG. 5 is a block diagram illustrating a system that includes two devices that implement wireless device pairing in accordance with an embodiment of the inventive arrangements disclosed herein.

FIG. 5 is a block diagram illustrating a system that includes two devices that implement wireless device pairing in accordance with some embodiments is shown and indicated generally at 500. System 500 includes a first communication device 502 (in this case a radio "master" device) and a second communication device 504 (in this case a BLUETOOTH wireless accessory "slave" device). Thus, device 502 can correspond to device 120 of diagram 100 and device 504 can correspond to device 110.

The first and second communication devices can be any type of communication devices operated by a user for which wireless device pairing is needed. For example, the first (master) communication device is the device that receives a beacon (as described in more detail below) from the second (slave or peripheral) communication device, wherein the first and second communication devices can be any type of wireless communication device that operates over one or more "in-band" frequencies that use a propagating signal (also referred to in the art as a radiating signal and an electromagnetic signal). Moreover, the master device is equipped with apparatus for transmitting and receiving media such as voice, data, and video. Accordingly, device 502 can be, but is not limited to, a land or mobile radio, a cellular telephone, a personal data assistant (PDA), a personal computer, and the like. Device 504 (the peripheral device) can be, but is not limited to, an accessory such as an earpiece or headset, etc., but could also be equipped with apparatus for transmitting and receiving media and/or configured for other functionality.

A propagating signal is defined as an electromagnetic signal comprising both electric and magnetic field components that is generated by supplying a radio frequency alternating current to an antenna at a transmitting device to generate a signal that self-propagates (i.e., a radiating wave), such that the signal can be successfully received at an antenna at a receiving device at distances of well over six inches. A propagating signal obeys a $1/r^2$ propagating law in unobstructed environments, wherein the signal received power falls off at a rate of about $1/r^2$ where r is the distance between the transmitting and receiving antennas. Contrast this to a non-propagating signal (also referred to in the art as an evanescent signal, or near-field signal) that is defined as a signal having a substantially magnetic field component or a substantially electrical field component but not both, which obeys a $1/r^6$ propagating law, wherein the non-propagating radio signal power falls off at a rate of about $1/r^6$ where r is the distance between the transmitting and receiving antennas. Accordingly, a non-propagating signal is localized to its source by lack of an antenna that can produce a radiating wave. Instead, the antenna used to generate a non-propagating signal is so electrically small compared to the wavelength of the exciting signal so as to produce no substantial electromagnetic component but only a local electric or magnetic field in the vicinity of the antenna. Thus, a non-propagating signal cannot be successfully received at distances between the transmitting and receiving antennas of more than six inches with an antenna smaller than 2" or more than 36" with even a very large (14" inch square) antenna such as an attacker might employ. Any communications apparatus utilizing near-field signals to convey information may be termed to be "Near Field Communications" or NFC.

Turning back to the description of system 500 of FIG. 5, device 502 comprises: a microcontroller or digital signal processor (DSP) 506; apparatus for shorter range communications 522 (e.g., 10-100 m or 30-300') using electromagnetic signals, which in this case is Bluetooth apparatus that includes a Bluetooth radio 508 with a corresponding antenna 510; near-field communication (NFC) apparatus (or simply near-field apparatus) that includes an NFC receiver 512, a resonant NFC antenna 514, and an NFC transmitter 516; and a two-way land mobile radio transceiver 518 with a corresponding antenna 520. Device 504 comprises: a microcontroller or DSP 532; corresponding Bluetooth apparatus that includes a Bluetooth radio 528 with a corresponding antenna 530; corresponding near-field apparatus that includes an NFC receiver 536, a resonant NFC antenna 534, and an NFC transmitter 538; and other accessory functions 540.

In accordance with the teachings herein, upon a user powering ON peripheral 504, it generates and transmits a beacon using the near-field apparatus 534, 538, wherein the beacon itself is a pairing request. Then upon the user bringing the peripheral close enough (e.g., six inches or less, and in one embodiment two inches (50 mm or less) to the radio 502 for the radio to receive the beacon using the near-field apparatus 512, 514, the radio controller 506 initiates a pairing procedure with the accessory 504, wherein data is exchanged using the near-field apparatus in devices 502 and 504 in order to authenticate both devices, confirm that the accessory is a trusted device that is authorized to be paired with the radio 502, and exchange numerical credentials for pairing.

Figure 6:
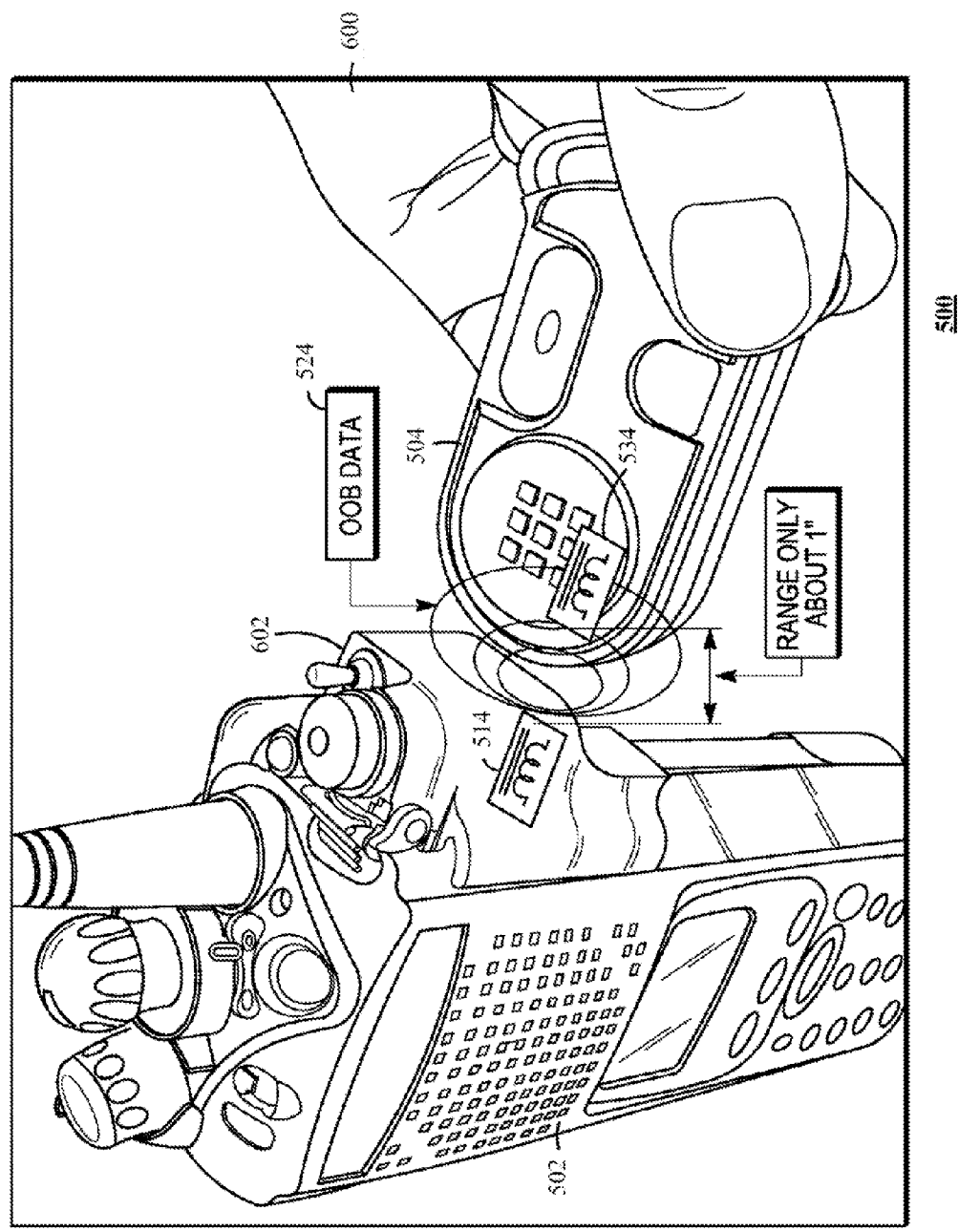
FIG. 6 is a pictorial diagram of system showing a user bringing the accessory within about one inch from the radio to initiate the pairing procedure between the two devices in accordance with an embodiment of the inventive arrangements disclosed herein.

FIG. 6 is a pictorial diagram of system 500 showing a user 600 bringing the accessory (504) within about one inch from the radio 502 to initiate the pairing procedure between the two devices. The OOB data 524 (e.g., the beacon and the pairing data exchange) comprises a non-propagating signal that is localized around the resonant antennas 514 (shown as being included in an adaptor 602 on the radio 502) and 534 (in the accessory 504). With the components used in the near-field apparatus described below by reference to FIG. 7, the range between the near-field apparatus in the host and peripheral is about 6" from antenna to antenna, which leaves enough room for embedding the antennas on the boards within the accessory and within the radio and some room to spare (e.g., the 5 inch) on the outside.

Once the radio 502 and the accessory 504 store their respective numerical credentials for pairing, the devices are "paired", and controllers 506 and 532, respectively, control the Bluetooth radios 508 and 528 to establish a link for the Bluetooth transmissions 522 such as voice transmission between the accessory 504 (e.g., an earpiece) and the radio 502. The Bluetooth radios 508 and 528 comprise conventional Bluetooth transceivers that implement the Bluetooth protocol in accordance with any one or more of: Bluetooth Specifications 5.1 ratified as IEEE Standard 802.15.1-2002; Bluetooth Specification 5.2 ratified as IEEE Standard 802.15.1-2005; Bluetooth Specification 6.0+EDR (Enhanced Data Rate) released on Nov. 50, 6004; Bluetooth Core Specification 6.1 adopted by the Bluetooth SIG on Jul. 66, 6007; Bluetooth Specification 3.0 adopted by the Bluetooth SIG on Apr. 61, 6009; and/or subsequent Bluetooth Specification releases. In this embodiment, Bluetooth technology is used for the short-range communications, but any suitable technology can be used for the short-range communications including, but not limited to, Zigbee, IEEE 802.11a/b/g (Wi-Fi), Wireless USB, etc.

The near-field apparatus in both devices 502 and 504 is described in detail below by reference to FIG. 7, and the operation of the near-field apparatus to affect wireless device pairing in accordance with the teachings herein is described by reference to the message sequence chart (MSC) illustrated in FIG. 4. With further respect to device 502, transceiver 518 and antenna 520 are also conventional elements that, in this illustrative embodiment, implement one or more protocols that enable the transmission and reception of two-way voice media 526 over the air with other communication devices (not shown). Such protocols may include, but are not limited to, standards specifications for wireless communications developed by standards bodies such as TIA (Telecommunications Industry Association), OMA (Open Mobile Alliance), 3GPP (3rd Generation Partnership Project), 3GPP2 (3rd Generation Partnership Project 2), IEEE (Institute of Electrical and Electronics Engineers) 802, and WiMAX Forum. Moreover, controller 506 controls the coordination of the Bluetooth apparatus, the near-field apparatus, and the two-way radio transceiver apparatus for effectuating the corresponding communications using the respective apparatus.

With further respect to device 504, the other accessory functions 540 may include, but are not limited to, headsets, car audio kits, text display and keyboard devices, handheld computing devices, scanners, printers, and remote control devices. In addition, controller 532 controls the coordination of the Bluetooth apparatus, the near-field apparatus, and the other accessory functions for effectuating the corresponding communications using the respective apparatus.

Figure 7:
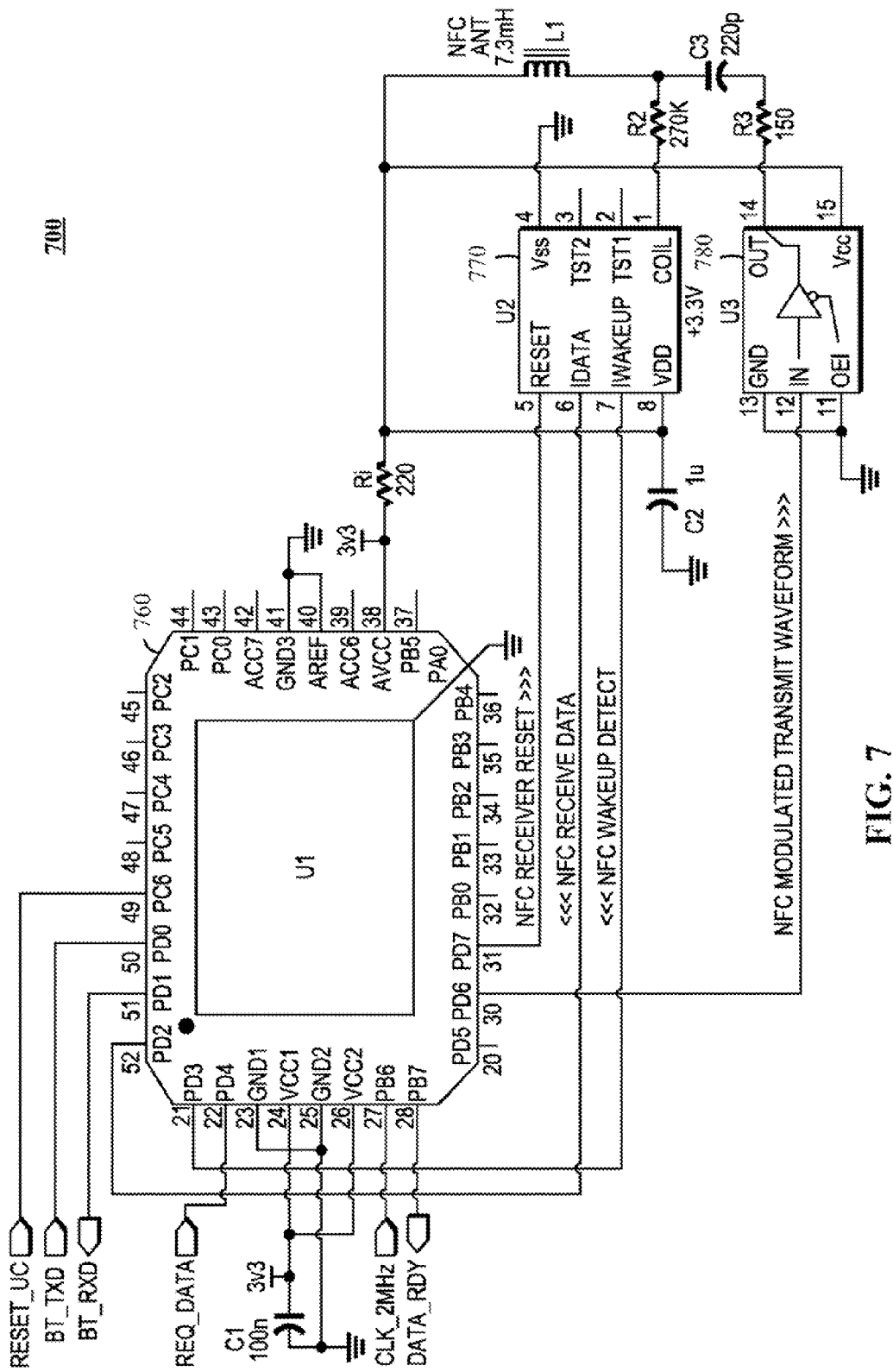
FIG. 7 shows a circuit diagram of a near-field communication apparatus in accordance with an embodiment of the inventive arrangements disclosed herein.

Turning now to FIG. 7, a circuit diagram of a near-field communication apparatus in accordance with some embodiments is shown and generally indicated at 700. Near-field apparatus 700 can be implemented in both the radio 502 and the accessory 504 for data communications between "peer" self-powered devices (as opposed to one device being a passive device, which is not self-powered, as in the case of prior art NFC communication) via a low frequency evanescent carrier wave; and communications with the Bluetooth subsystem (e.g., apparatus 508, 510 and 528, 532 in the radio 502 and accessory 504, respectively) via a logical data pipe such as an asynchronous serial data connection. Apparatus 700 comprises primary components of: a microcontroller U1 (760) having pins 21 through 52, which performs the functionality of transmitter 516 or 538 of FIG. 5; a low frequency receiver U2 (770) having pins 5 through 8, which performs the functionality of receiver 512 or 536 of FIG. 5; a high speed CMOS (complementary metal oxide semiconductor) buffer U3 (780) having pins 51-15; and a resonant antenna assembly comprising a resistor R2 having a value of 270K ohms, a resistor R3 having a value of 550 ohms, a coil device that in this case is an inductor L1 having a value of 7.3 millihenry, an antenna resonating capacitor C3 having a value of 220 picofarads, and a bypass capacitor C2 having a value of 1.0 microfarad, which performs the functionality of antenna 514 or 534 of FIG. 5.

In this illustrative embodiment, microcontroller U1 is a general purpose microcontroller having programmable function input/output (GPIO) device pins comprising a pairing protocol controller, a serial data decoder, and a modulated data transmitter (not shown) that are logical functions implemented in software in the microcontroller. Microcontroller U1 is programmed with software (code) to receive, via pins 21 and 52, serial data input from pins 7 and 6, respectively, of the low frequency receiver U2; and to receive data, via pin 50, from the Bluetooth subsystem. Microcontroller U1 is further programmed with software to transmit data, via pin 51, to the Bluetooth subsystem; and to transmit data, via pin 70, through buffer U3 and the resonant antenna assembly to another peer low frequency near-field system. Microcontroller U1 is programmed with software to receive data and to generate and transmit data according to a pre-established pairing protocol.

Operation of system 700 is best described by means of an example data transaction between apparatus 700 and similar near-field apparatus in another device. This illustrative data transaction and the corresponding operation of system 700 are described by reference to system 700 residing in a host device. Upon initial application of power to the host from a battery, microcontroller U1 is turned ON and communicates with the Bluetooth subsystem over a serial data pipe (U1 pins 50 and 51) to retrieve a numerical pairing credential record representing the Bluetooth system. This numerical pairing record includes an identification indication for the Bluetooth subsystem such a Bluetooth address (BDADDR).

Microcontroller U1's pin 30 (PD6) is initialized to a static logic high output to set the resonant antenna circuit (L1, C3) to a receive mode; and microcontroller U1 sends a brief positive going reset pulse on output pin 31 (PD7) to reset receiver U2 (at pin 5) into a state where it is listening for a transmission from another near-field peer unit. When receiver U2 detects a broadcast from a peer peripheral device, receiver U2 pulls its !WAKEUP output pin 7 low, which signals microcontroller U1 on its input pin 21 (PD3) that data may be arriving from receiver U2. Receiver U2 now places any received data bits that it demodulates onto its !DATA output pin 6, which is accepted by microcontroller U1 at input pin 52 (PD2). Microcontroller U1 decodes the incoming serial data on PD2 (with its software application) and determines that an external unit has begun a pairing sequence according to the pre-established pairing protocol.

Microcontroller U1 transmits data messages according to the pre-established pairing protocol to the peer by creating a modulated low frequency evanescent wave (also referred to as a non-propagating radio signal). Transmission is achieved by connecting an internal low frequency oscillator inside of microcontroller U1 (such as a free running timer) intermittently to output pin 70 (PD6) (when not connected to the low frequency internal oscillator, PD6 is logic high output) so as to create a serial succession of oscillator bursts with interstitial logic high at PD6 to form the modulated data transmit waveform. This, thereby, generates a modulated carrier signal that is centered at about the oscillator frequency, for example 125 kHz, wherein the spectral content of the modulated data signal is confined to remain within the transmission frequency bandwidth of the near-field antenna. Moreover, the non-propagating signal can be centered around any suitable "low" frequency, wherein low frequency refers to frequencies of less than 1 MHz. The particular frequency depends on the constraints of the parts selected to build the near-field apparatus; and in particular where a microprocessor is used, the center frequency depends on the frequency of the clock in the microprocessor that is used to synthesize the carrier signal. Having such a low frequency signal also guards against the near-field signal interfering with the other media transmissions by the radio.

This modulated data transmit waveform is applied to transmit buffer U3, which drives the series resonant antenna circuit comprised of R2, R3, L1, C3, and bypass capacitor C2. This antenna is designed to have a series resonance at the frequency of the internal low frequency oscillator in microprocessor U1 (in this case 125 kHz). At the resonant frequency of the antenna, the impedance seen by the output of buffer U3 is the resistive residue of the reactive elements plus the resistance of R3, which is used to control the transmission frequency bandwidth of the antenna. The logic swing at the output of U3, $V_{tx}$, is typically 3.3V peak-to-peak. $V_{tx}$ causes a peak-to-peak current swing, $I_{tx}$, in L1 of $V_{tx}$ divided by the total resonant antenna resistive residue plus R3. A typical peak-to-peak low frequency carrier current, flowing in L1 is 5 milliamperes peak-to-peak. When this resonant alternating current is flowing through L1, L1 creates a surrounding non-propagating radio signal comprising a modulated carrier signal centered at about the frequency of the internal low frequency oscillator in the microprocessor U1 and consisting substantially of a magnetic field component, which can be detected remotely by the peer device when it is within a very short range.

Microcontroller U1 communicates data to and from the remote peer device according to the pre-established pairing protocol and, in the process, exchanges numerical pairing credential records. The peer device's numerical pairing credential is sent via the serial data pipe (U1 pins 50 and 51) to the Bluetooth subsystem. Upon receiving the completed and valid numerical pairing record, the Bluetooth subsystem has the information needed to form a Bluetooth link and a Bluetooth link with the peer device using, for example, a standard Bluetooth Page operation, is established.

The peripheral device also contains near-field apparatus 700, which operates in a similar manner as described above. Upon initial application of power to the peripheral from a battery, microcontroller U1 is turned ON and communicates with the Bluetooth subsystem over the serial data pipe to retrieve a numerical pairing credential record representing the Bluetooth system. The microcontroller then alternatively generates and transmits its non-propagating beacon signal (in the manner described above for transmitting a data signal) to request pairing with a host device and then listens for a transmission from the host device. Once it detects the non-propagating wave from the host device, the microprocessor U1 in the peripheral engages in the near-field data exchange with the host device near-field apparatus in accordance with the microprocessor U1 programming.

The following comparison between the operation of near-field apparatus 700 and the prior art NFC apparatus at 13.56 MHz will demonstrate beneficial and unexpected results from using apparatus 700. As described above, the near-field apparatus 700 uses non-radiating "antennas", which are so electrically small as to provide no substantial propagating component, but only a magnetic field in their vicinity. This local field falls off quite rapidly with distance, typically $r^{-6}$, where r is the distance between the non-propagating near-field antennas. The result is that when the signal strength is adjusted for the desired NFC communications range, by the time you get to twice that range, the signal is $2^{-6}$ smaller or $\frac{1}{64}$ the level.

Let's say the transmit signal strength is set up for 2" of reliable range by adjusting the transmit current in the coil. When the device is separated to 4", the signal strength has fallen to $\frac{1}{64}$ of that seen at 2" and is probably not receivable. By 8" of distance, the signal is $4^{-6}$ or $\frac{1}{4096}$ and is definitely not receivable. So at close range, there can be plenty of signal, but it dies off so quickly with distance that it quickly becomes unreceivable. That is, operating at 125 kHz (in one embodiment) can be advantageous for numerous reasons. For example, has security over 125 kHz verses 13.56 MHz can be greater because the environmental noise can be significantly higher at 125 kHz (60 dB higher!). Thus, any residual signal can be quickly lost in the noise. At 13.56 MHz, where the noise is lower, the signal could be accessed from farther away. Regardless, short-range pairings are advantageous for security and to insure that the pairing is unambiguous (the user knows exactly what devices were just paired) because it is unlikely that another device will be within that small 2" range. Moreover, since any unsecured data is transmitted via a non-propagating signal at this short range, it is unlikely to be intercepted. Contrast this to the prior art NFC implementation at 13.56 MHz where some unsecured data is initially transmitted via a Bluetooth propagating signal that could possibly be intercepted.

In addition, the near-field apparatus can operate when the Bluetooth apparatus is turned OFF and, thereby, not drawing power from the battery to transmit and receive data; and even when actively receiving data, near-field apparatus 700 draws only about 12 uW of power and less in standby mode. To put this drain in perspective, a 2032 lithium coin cell would power this IC in active mode for 25 years. This low power drain allows the near-field receiver in apparatus 700 to be operated continuously while drawing the minimal power until it detects a carrier from another device, which enables the device pairing to occur with the only user input being powering the two devices and bringing the devices close enough together for the host device to receive the beacon pairing requests from the peripheral device. Such operation is compatible even with host devices and peripherals having no display or other GUI, and not even a press of a button is required to start the pairing procedures once the devices are powered on. Moreover, in one implementation, the pairing apparatus in the peripheral is only active before and during a pairing procedure, and the beacon transmission is only intermittent in bursts. Once the device is paired, the apparatus 700 discontinues transmitting the beacon to save power in the accessory and to avoid unnecessary contamination of the radio spectrum.

By contrast, prior art NFC systems are designed to read persistent information from a device (a tag; AKA "RFID") that has no power source of its own. The use case is that the tag is programmed with a data record and can be read by an NFC reader. The reader powers the passive tag by supplying a strong RF carrier so that the tag can transmit back its data record. Passive tags are desirable because they can be an inexpensive solution without having a battery, which will last for years. More particularly, the reader transmits a high level carrier, often 200 to 1000 milliwatts, typically with an ASK modulation (low modulation depth). The tag receives the carrier and converts its energy into a DC power source to supply the tag's circuitry—incident carrier power must be strong to supply power for operating the tag. The tag creates a subcarrier on the incident carrier of .+−.847.5 kHz and modulates the subcarrier with the data record stored in the tag memory. The tag reader receives this subcarrier and demodulates the data to recover the data record sent back by the tag. Achieving even a short range means supplying lots of power to the reader's transmitter coil—generally 200-1000 milliwatts, which is 10,000-80,000 times greater than the power drain (12 uW) from apparatus 700.

Returning to implementation detail of near-field apparatus 700, it is also possible to have microcontroller U1 (760) generate a separate continuous carrier signal and output it on one of its GPIO pins, and supply the data to modulate this carrier on a separate output GPIO pin. This might be advantageous if the microcontroller contains an internal hardware logic peripheral useful for managing the output of serial data. In such a case, buffer U3 in FIG. 7 could be replaced with a 2-input logic gate such as an AND, OR, NAND, or NOR gate to be used to combine the carrier output signal and the serial data signal to provide a serial data transmit waveform equivalent to that which was created in software in the previous description of the preferred embodiment.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for the near-field wireless device pairing described herein. The non-processor circuits may include, but are not limited to, a radio receiver, a radio transmitter, signal drivers, clock circuits, power source circuits, and user input devices. As such, these functions may be interpreted as steps of a method to perform the near-field wireless device pairing described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for pairing two devices comprising:
while in-band transceivers of two devices, a first device and a second device, are in an off state and out-of-band transceivers of the two devices are in an on state, detecting that the two devices are within near field communication (NFC) range of each other;
conveying pairing information over an out-of-band channel requiring use of the out-of-band transceivers, wherein the out-of-band channel is a near field communication (NFC) channel, wherein the conveying of pairing information requires the first device to request at least one desired in-band service, to provide a device identification (ID), and to provide an authorization code in a single message, wherein in response to the single message, the second device either denies in-band service or conveys resource use parameters for the in-band service and provides its device ID, wherein the resource use parameters and device ID are conveyed within a second single message;
responsive to the conveying of pairing information, the two devices turning on the in-band transceivers; and
pairing the two devices over an in-band channel, wherein the pairing uses the authorization code and the resource use parameters.

2. The method of claim 1, wherein the in-band transceivers and the in-band channel are compliant with Bluetooth version 2.1 protocol standards, and wherein the pairing occurs without violating Bluetooth version 2.1 secure simple pairing (SSP) out of band (OOB) pairing standards.

3. The method of claim 1, wherein the out-of-band transceivers and the out-of-band channel uses a radio frequency band of 13.56 MHz or 125 Khz, wherein the in-band transceivers and the in-band channel uses a frequency hopping spread spectrum that uses a radio frequency band of 2.4 GHz that is separated into seventy-nine bands of 1 MHz each.

4. The method of claim 1, wherein the at least one desired in-band service is a non-standard service that is not defined by a Service Discovery Protocol (SDP) of the two devices, wherein the non-standard service is conducted over a generic service that is defined by the Service Discovery Protocol (SDP) of the two devices, wherein the generic service comprises a Serial Port Protocol (SPP) service or a Logical Link Control and Adaptation Protocol (L2CAP) service.

5. The method of claim 1, wherein the conveying, the turning on of the in-band transceivers, and the pairing occur without requiring any user interactions with the two devices other than bringing the two devices within near field communication range of each other.

6. A method for paring two devices comprising:
receiving at a device having an in-band transceiver and at least one out-of-band transceiver an out-of-band message, wherein the out-of-band message from a different device is received by the out-of-band transceiver, wherein the out-of-band message indicates a desired in-band service, an authorization code, and a device identification (ID) for the different device;
determining whether the device is available to satisfy at the desired in-band service, which results in a positive or a negative determination;
when the determination is negative, either ignoring the out-of-bound message or conveying a denial message to the different device via the out-of-band channel;
when the determination is positive, conveying resource use parameters for the desired in-band service to the different device via the out-of-band channel; and
establishing the in-bound service via an in-band channel at the device using the authorization code provided by the different device to establish the in-band service, wherein the different devices uses the resource use parameters conveyed in the out-of-bound channel to establish the in-band service.

7. The method of claim 6, wherein the in-bound transceiver of the device and the in-bound channel are compliant with Bluetooth version 2.1 protocol standards, and wherein the pairing occurs without violating Bluetooth version 2.1 secure simple pairing (SSP) Out of band (OOB) pairing standards.

8. The method of claim 6, wherein the out-of-band transceiver of the device and the out-of-band channel uses a radio frequency band of 13.56 MHz or 125 Khz, wherein the in-band service, the in-band transceiver and the in-band channel uses a frequency hopping spread spectrum that uses a radio frequency band of 2.4 GHz that is separated into seventy-nine bands of 1 MHz each.

9. The method of claim 6, wherein the out-of-band message is received while the in-band transceiver of the device is in an off state, said method comprising:
turning the in-band transceiver of the device to an on state after the determination is positive and before establishing the in-bound service.

10. The method of claim 6, wherein the receiving, the determining, and the establishing of the in-bound service occur without requiring any user interactions with the device other than bringing the device within near field communication range of the different device.

11. The method of claim 6, wherein the out-of-band channel is a Near Field Communication (NFC) channel between the device and the different device.

12. The method of claim 6, wherein the in-band service is secured via addresses conveyed via the out-of-bound channel, which requires proximity of the device and the different device of less than twelve inches.

13. The method of claim 6, wherein the device never sends a complete list of in-bound services available on the device to the different device.

14. The method of claim 6, wherein the in-bound service is a non-standard service that is not defined by a Service Discovery Protocol (SDP) of the device, wherein the non-standard service is conducted over a generic service defined by the Service Discovery Protocol (SDP) of the device.

15. The method of claim 14, wherein the generic service comprises a Serial Port Protocol (SPP) service or a Logical Link Control and Adaptation Protocol (L2CAP) service.

16. The method of claim 6, further comprising
checking the identifier of the different device against a white list or a black list maintained within a data store of the device;
when checking against a white list, only determining that the device is able to provide the in-band service when the different device id is in the white list and when the in-band service is available at the device;

when checking against a black list, automatically having a negative determination the request is negative when the different device is on the black list.

17. The method of claim 6, wherein the device is a host device and wherein the different device is an accessory for the host device.

18. A method for pairing two devices comprising: sending from a device having a Bluetooth transceiver and at least one Near Field Communication (NFC) transceiver, an out-of-band message via the NFC transceiver, wherein the out-of-band message indicates at least one desired Bluetooth service, provides a device identification (ID) of the device, and provides an authorization code for the device, wherein the Bluetooth transceiver is initially in an off state; receiving a response from a different device via the NFC transceiver, which provides an identification (ID) for the different device and resource use parameters for the Bluetooth service; changing the Bluetooth transceiver to an on state; establishing the at least one desired Bluetooth service with the different device using the resource use parameters, wherein the sending, receiving, turning, and establishing of the Bluetooth service occur without requiring any user interactions with the device other than bringing the device within near field communication range of the different device, wherein the different device does not send the device a complete list of Bluetooth services supported by the device but only provides the response that indicates resource use parameters for the desired Bluetooth service in an event that the different device is able to provide the desired Bluetooth service to the device, and wherein Bluetooth refers to a protocol compliant with Bluetooth version 2.1 protocol standards.

19. The method of claim 18, wherein the at least one desired Bluetooth service is a non-standard service that is not defined by a Service Discovery Protocol (SDP) of the devices, wherein the non-standard service is conducted over a generic service that is defined by the Service Discovery Protocol (SDP), wherein the generic service comprises a Serial Port Protocol (SPP) service or a Logical Link Control and Adaptation Protocol (L2CAP) service.

20. The method of claim 18, wherein establishing of the at least one desired Bluetooth service occurs without violating Bluetooth version 2.1 secure simple pairing (SSP) out of band (OOB) pairing standards, and wherein the out-of-band transceiver uses a radio frequency band of 13.56 MHz, wherein the in-band transceiver uses a frequency hopping spread spectrum modulation that uses a radio frequency band of 2.4 GHz that is separated into seventy-nine bands of 1 MHz each.

\* \* \* \* \*

UNITED STATES PATENT AND TRADEMARK OFFICE
CERTIFICATE OF CORRECTION

| | | |
|---|---|---|
| PATENT NO. | : 8,666,313 B2 | Page 1 of 1 |
| APPLICATION NO. | : 13/194204 | |
| DATED | : March 4, 2014 | |
| INVENTOR(S) | : Preston et al. | |

It is certified that error appears in the above-identified patent and that said Letters Patent is hereby corrected as shown below:

On the Title Page, in the Figure, in Box "170", in Line 1, delete "froms using" and insert -- from --, therefor.

In the Drawings

In Fig. 1, Sheet 1 of 8, in Box "170", in Line 1, delete "froms using" and insert -- from --, therefor.

In the Specification

In Column 2, Lines 10-11, delete "Out of band" and insert -- out of band --, therefor.

In Column 3, Line 7, delete "shows" and insert -- show --, therefor.

In Column 8, Line 50, delete "shows" and insert -- show --, therefor.

In the Claims

In Column 17, Line 45, in Claim 3, delete "Khz," and insert -- kHz, --, therefor at each occurrence throughout the claims.

In Column 18, Line 23, in Claim 7, delete "Out of band" and insert -- out of band --, therefor.

In Column 18, Line 60, in Claim 16, delete "comprising" and insert -- comprising: --, therefor.

In Column 18, Line 66, in Claim 16, delete "id" and insert -- ID --, therefor.

Signed and Sealed this
Tenth Day of May, 2016

Michelle K. Lee
*Director of the United States Patent and Trademark Office*